US008273265B2

(12) United States Patent
Nazarov et al.

(10) Patent No.: US 8,273,265 B2
(45) Date of Patent: Sep. 25, 2012

(54) PHOSPHORS AND LIGHT EMITTING DEVICE USING THE SAME

(75) Inventors: Mihail Nazarov, Gyunggi-do (KR); Chul Soo Yoon, Gyunggi-do (KR); Hyo Jung Kim, Seoul (KR)

(73) Assignee: Samsung Electronics Co., Ltd., Seoul (KR)

( * ) Notice: Subject to any disclaimer, the term of this patent is extended or adjusted under 35 U.S.C. 154(b) by 694 days.

(21) Appl. No.: 12/003,812

(22) Filed: Jan. 2, 2008

(65) Prior Publication Data

US 2008/0160343 A1  Jul. 3, 2008

(30) Foreign Application Priority Data

Jan. 2, 2007  (KR) ................. 10-2007-0000182

(51) Int. Cl.
*H01L 33/00* (2010.01)
*C09K 11/56* (2006.01)
*C09K 11/55* (2006.01)
*C09K 11/62* (2006.01)

(52) U.S. Cl. ............... 252/301.4 S; 257/98; 428/403; 428/404; 313/486; 313/487; 313/503

(58) Field of Classification Search ........... 252/301.4 R, 252/301.6 R, 301.4 S, 301.6 S; 428/403, 428/404; 257/98; 313/486, 487, 503
See application file for complete search history.

(56) References Cited

U.S. PATENT DOCUMENTS

| 4,309,481 A | * | 1/1982 | Wakatsuki et al. ........... 428/403 |
| 5,032,316 A | * | 7/1991 | Takahashi et al. ...... 252/301.6 S |
| 5,418,062 A | * | 5/1995 | Budd ........................ 428/403 |
| 5,518,808 A | * | 5/1996 | Bruno et al. .................. 428/323 |
| 5,667,724 A | * | 9/1997 | Petersen ................. 252/301.6 R |
| 6,417,019 B1 | | 7/2002 | Mueller et al. |
| 6,544,438 B2 | | 4/2003 | Yocom et al. |
| 6,919,682 B2 | | 7/2005 | Cheong et al. |
| 2005/0023963 A1 | | 2/2005 | Menkara et al. |
| 2006/0159853 A1 | * | 7/2006 | Chung et al. ................ 427/304 |
| 2006/0257659 A1 | * | 11/2006 | Hampden-Smith et al. .. 428/402 |
| 2007/0045645 A1 | * | 3/2007 | Yoon et al. ..................... 257/98 |
| 2007/0125984 A1 | * | 6/2007 | Tian et al. .............. 252/301.4 S |

FOREIGN PATENT DOCUMENTS

| JP | 01-104684 | 4/1989 |
| JP | 04-230996 A | 8/1992 |
| JP | 08-540871 A | 5/1996 |
| WO | WO 00/12649 | 3/2000 |

OTHER PUBLICATIONS

Nakamura, S., "The Blue Laser Diode," Chapter 10.4, pp. 216-221.
Japanese Office Action, w/ English translation thereof, issued in Japanese Patent Application No. JP 2007-338472 dated Apr. 26, 2011.

* cited by examiner

*Primary Examiner* — Carol M Koslow (74) *Attorney, Agent, or Firm* — McDermott Will & Emery LLP (57) ABSTRACT

There are provided phosphors having high luminous efficiency at desired wavelengths and good light output stability and a light emitting device using the same. A phosphor according to an aspect of the invention includes a sulfide crystallographic phase and an oxide crystallographic phase. Here, the phosphor is a multiphase compound in which the sulfide crystallographic phase and the oxide crystallographic phase exist together.

12 Claims, 6 Drawing Sheets

PHOSPHORS AND LIGHT EMITTING DEVICE USING THE SAME

CROSS-REFERENCE TO RELATED APPLICATIONS

This application claims the priority of Korean Patent Application No. 2007-00182 filed on Jan. 2, 2007, in the Korean Intellectual Property Office, the disclosure of which is incorporated herein by reference.

BACKGROUND OF THE INVENTION

1. Field of the Invention

The present invention relates to phosphors and a light emitting device using the same, and more particularly, to phosphors that have high luminous efficiency at desired wavelengths and good light output stability, and a light emitting device using the same.

2. Description of the Related Art

In general, light emitting devices (LEDs) emit light close to monochromatic light while other light emitting devices, for example, incandescent lamps emit light with a broad emission spectrum. Since the individual LEDs have different energies generated by combination of electrons and holes, the LEDs emit red light, green light, blue light, yellow-orange light, and yellow light according to characteristics thereof.

In recent years, LEDs that emit white light or produce a plurality of colors have been developed. A method of manufacturing a white LED among the LEDs includes a method of combining LED chips to produce white or a method of combining an LED chip emitting light of a predetermined color with phosphors fluorescing and emitting light of predetermined colors. The white LED, which has been widely used, is manufactured according to the latter.

For example, a white LED package can be manufactured by sealing a blue LED chip with molding resin in which a yellow phosphor is dispersed. When the blue LED chip generates light with a wavelength range of 460 nm, the yellow phosphor that absorbs the generated light emits light with a wavelength of 545 nm. Further, the light generated from the blue chip and the light from the yellow phosphor that have different wavelength ranges from each other are mixed to output white light.

White LEDs are being used as backlights of liquid crystal displays instead of general small lamps or fluorescent lamps. As discussed by S. Nakamura "The Blue Laser Diode," Springer, Chapter 10.4, pp. 216-221, 1977, white LEDs can be manufactured by forming a ceramic phosphor layer on the output surface of a blue LED.

In the related art, an LED having InGaN single quantum wells is used as the blue LED, and cerium-doped yttrium aluminum garnet (YAG:Ce), $Y_3Al_5O_{12}:Ce^{3+}$ is used as a phosphor. Blue light emitted by the blue LED excites the phosphor such that the phosphor emits yellow light.

The blue light emitted by the blue LED is transmitted through the phosphor and is mixed with the yellow light emitted by the phosphor. An observer (viewer) perceives the mixture of blue and yellow light as white light. The blue LED emits light (blue light) at a wavelength ranging from 420 to 480 nm. When the blue light is combined with the yellow phosphor, white light having a color temperature of 6000 to 8000 K and a color rending index (CRI) of approximately 77 is generated.

Further, the blue LED can generate white light by being combined with a phosphor converting blue light into red light and a phosphor converting blue light into green light. Appropriate phosphors need to have high excitation efficiency within a range of 420 to 480 nm and a wide chromaticity zone. Therefore, efforts have been made to seek red, orange, and yellow phosphors that are combined with electroluminescent devices to change the light emission or the chromaticity zone.

Most of the white LED displays in commercial use operate by converting a part of light emitted from the blue LED into yellow light, or red and green light by using phosphors. Further, the part of the blue light from the LED is transmitted through the phosphor and mixed with yellow or red and green phosphor emission to thereby generate white light that can be perceived. Many researchers have carried out research into phosphors and obtained various results. These results are shown in the following cited references. The disclosures of the cited references are expressly incorporated herein by reference.

Novel phosphors useful in the manufacture of white light emitting diodes are disclosed in U.S. Patent Publication No. 2005-0023963. The phosphors provided by the invention are described by the formulae: $MA_2(S_xSe_y)_4$:B and/or $M_2A_4(S_x\text{-}Se_y)_7$:B in which x, and y are each independently any value between 0 and 1, including 0 and 1 subject to the proviso that the sum of x and y is equal to any number in the range of between about 0.75 and about 1.25; M is at least one of Be, Mg, Ca, Sr, Ba, Zn; A is at least one of Al, Ga, In, Y, La, and Gd; and wherein the activator(s), B, comprises one or more element selected from the group consisting of: Eu, Ce, Cu, Ag, Al, Tb, Cl, Br, F, I, Mg, Pr, K, Na, and Mn, including mixtures comprising any two, any three, any four, any five, any six, any seven, or more of these elements in any proportion, and wherein the elements in these mixtures may each independently be present in any amount between 0.0001% and about 10% in mole percent based on the total molar weight of said composition.

A method of forming high efficiency emission alkali metal activated gallium sulfide phosphors by including an excess of 1-7% of gallium is disclosed in U.S. Pat. No. 6,544,438. A solution of a soluble gallium salt is added to a sulfate precipitate of an alkali metal sulfate and firing in hydrogen sulfide atmosphere at temperatures up to about 900° C.

In U.S. Pat. No. 6,417,019, a method of fabricating a light emitting device includes providing a light emitting diode that emits primary light, and locating proximate to the light emitting diode a $(Sr_{1-u-v-x} Mg_u Ca_v Ba_x) (Ga_{2-y-z} Al_y In_z S_4):Eu^{2+}$ phosphor material capable of absorbing at least a portion of the primary light and emitting secondary light having a wavelength longer than a wavelength of the primary light. The composition of the phosphor material can be selected to determine the wavelengths of the secondary light. In one embodiment, the light emitting device includes the phosphor material dispersed as phosphor particles in another material disposed around the light emitting diode. In another embodiment, the light emitting device includes the phosphor material deposited as a phosphor film on at least one surface of the light emitting diode.

A phosphor and a method of deposition are disclosed in U.S. Pat. No. 6,919,682. The phosphor comprises a composition of the formula $M'_aBa_{1-a}M''_2M'''_4$:RE, where M' is at least one element selected from magnesium and calcium, M" is at least one element selected from aluminum, gallium and indium, M''' is at least one element selected from sulphur, selenium and tellurium, RE is at least one rare earth element, especially europium or cerium, and 0<a<1.

According to various different references including the above cited references, phosphors having new compositions or improved characteristics of known materials have been proposed. However, fluorescent materials currently being used to convert origin ultraviolet (UV), blue, or green light do not satisfy luminous efficiency and light output stability that are required when the fluorescent materials are used in LEDs.

In terms of these aspects, there has been a need for an LED that emits white light by using fluorescent materials with high luminous efficiency and good light output stability and a method of manufacturing the same.

SUMMARY OF THE INVENTION

An aspect of the present invention provides phosphors having high luminous efficiency at desired wavelengths and good light output stability and a light emitting device using the same.

According to an aspect of the present invention, there is provided a phosphor including: a sulfide crystallographic phase; and an oxide crystallographic phase, in which the phosphor is a multiphase compound in which the sulfide crystallographic phase and the oxide crystallographic phase exist together.

The sulfide crystallographic phase may be from the class of thiometallates, and the oxide crystallographic phase may be from one of the classes of alkaline earth metal oxides, oxides of zinc, and oxides of cadmium.

The thiometallate may be represented by formula: $A^1M^1_2S_4$, where $A^1$ may be at least one element selected from a group consisting of magnesium, calcium, strontium, zinc, cadmium, and barium, and where $M^1$ may be at least one element selected from a group consisting of aluminum, gallium, ytterbium, and scandium.

The thiometallate may be strontium thiogallate ($SrGa_2S_4$).

The alkaline earth metal oxide, the oxides of zinc and the oxides of cadmium may be represented by formula: $A^2M^2_2O_4$, where $A^2$ may be at least one element selected from a group consisting of magnesium, calcium, strontium, zinc, cadmium, and barium, and where $M^2$ may be at least one element selected from a group consisting of aluminum, gallium, ytterbium, and scandium.

The alkaline earth metal oxide may be a magnesium gallium oxide ($MgGa_2O_4$).

The phosphor may further include an activator, in which the activator may include at least one rare earth element.

The activator may include at least one element selected from a group consisting of cerium, praseodymium, neodymium, promethium, samarium, europium, gadolinium, terbium, dysprosium, holmium, erbium, thulium, ytterbium, and lutetium.

The phosphor may further include a co-activator, in which the co-activator may include at least one element selected from a group consisting of chlorine, bromine, and lithium. The phosphor may be $[\{SrGa_2S_4\}.\{MgGa_2O_4\}]:Eu^{2+}$.

Another aspect of the present invention provides a light emitting device including: a light source; and a phosphor absorbing light emitted from the light source to emit light, in which the phosphor includes a sulfide crystallographic phase and an oxide crystallographic phase, and the phosphor is a multiphase compound in which the sulfide crystallographic phase and the oxide crystallographic phase exist together.

The light source may be anyone of a light emitting diode or a laser diode. The light source may emit light with a wavelength ranging from 400 to 480 nm.

The phosphor may be $[\{SrGa_2S_4\}.\{MgGa_2O_4\}]:Eu^{2+}$.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Phosphors according to an embodiment of the invention include sulfide crystallographic phases and oxide crystallographic phases. The phosphors are multiphase compounds in which sulfide crystallographic phases and oxide crystallographic phases are mixed.

Phosphors according to an embodiment of the invention can be used in light emitting devices. According to one embodiment of the invention, a white light emitting device can be realized by using a phosphor emitting green light together with a blue light emitting diode and a red phosphor.

The phosphors according to the embodiment of the invention are based on at least two different crystallographic phases. One is a sulfide crystallographic phase, and the other is an oxide crystallographic phase. The sulfide crystallographic phase and the oxide crystallographic phase are not simply mixed with each other as independent phosphors but exist together in the phosphor as a compound. For example, two crystallographic phases may exist together in one crystal gain. The phosphor may contain the sulfide crystallographic phase and the oxide crystallographic phase in any proportion.

Preferably, the sulfide crystallographic phase may be from the class of thiometallates. The thiometallates may be represented by formula $A^1M^1_2S_4$, where $A^1$ is at least one divalent cation selected from a group consisting of Mg, Ca, Sr, Zn, Cd, and Ba, and where $M^1$ is at least one trivalent cation selected from a group consisting of Al, Ga, Y, and Sc. In particular, the thiometallate is strontium thiogallate ($SrGa_2S_4$).

The oxide crystallographic phase may be from one of the classes of alkaline earth metal oxides, oxides of zinc, and oxides of cadmium that may be represented by Formula $A^2M^2_2O_4$. Here, $A^2$ is at least one divalent cation selected from a group consisting of Mg, Ca, Sr, Zn, Cd, and Ba. Further, $M^2$ is at least one trivalent cation selected from a group consisting of Al, Ga, Y, and Sc. In particular, the alkaline earth metal oxide is a magnesium gallium oxide ($MgGa_2O_4$).

Therefore, when the sulfide crystallographic phase is the strontium thiogallate ($SrGa_2S_4$), and the oxide crystallographic phase is the magnesium gallium oxide ($MgGa_2O_4$), the phosphor has a composition represented by Formula 1.

[Formula 1]

$$[\{SrGa_2S_4\}.\{MgGa_2O_4\}]:M \qquad (I)$$

The element Sr is less electronegative than the element Mg. Further, the cation-anion lengths Sr—S in the strontium thiogallate phosphor ($SrGa_2S_4$) are larger (3.12 Å) than Mg—O in the magnesium gallium oxide ($MgGa_2O_4$) (2.05 Å). The Sr—S bonds are then less covalent than the Mg—O bonds. The nephelauxetic effect is weaker in $SrGa_2S_4$ than in $MgGa_2O_4$.

A stronger nephelauxetic effect or centroid shift causes a shift in peak wavelength. A peak wavelength of $[\{SrGa_2S_4\}.\{MgGa_2O_4\}]:M$ according to the embodiment of the invention shifts from 535 nm corresponding to a wavelength of $SrGa_2S_4$ to 540 nm. Further, since $SrGa_2S_4$ is less character and causes a weaker nephelauxetic effect than $MgGa_2O_4$, $SrGa_2S_4$ has lower stability than $MgGa_2O_4$. Therefore, the use of $SrGa_2S_4$ and $MgGa_2O_4$ provides higher stability than the use of $SrGa_2S_4$.

In Formula (I), M refers to an activator. The activator activates the sulfide crystallographic phase and the oxide crystallographic phase. The activator may be one or more rare earth elements.

The activator may contain at least one rare earth element selected from a group consisting of cerium, praseodymium, neodymium, promethium, samarium, europium, gadolinium, terbium, dysprosium, holmium, erbium, thulium, ytterbium, and lutetium. Particularly, the activator may be europium (Eu).

The phosphor may further include a co-activator. The phosphor is doped with the co-activator together with the activator. The co-activator assists the activator in activating the phosphor. The co-activator may be selected from a group consisting of chlorine, bromine, and lithium.

According to the embodiment of the invention, when the thiometallate is strontium thiogallate ($SrGa_2S_4$), the alkaline earth metal oxide is a magnesium gallium oxide ($MgGa_2O_4$), and the activator is Eu, the phosphor may be $[\{SrGa_2S_4\}.\{MgGa_2O_4\}]:Eu^{2+}$.

The above-described phosphor according to the embodiment of the invention absorbs high efficiency blue light emitted from a light source, such as an LED and a laser diode, and emits light having a wavelength longer than the light absorbed from the light source.

Figure 1:
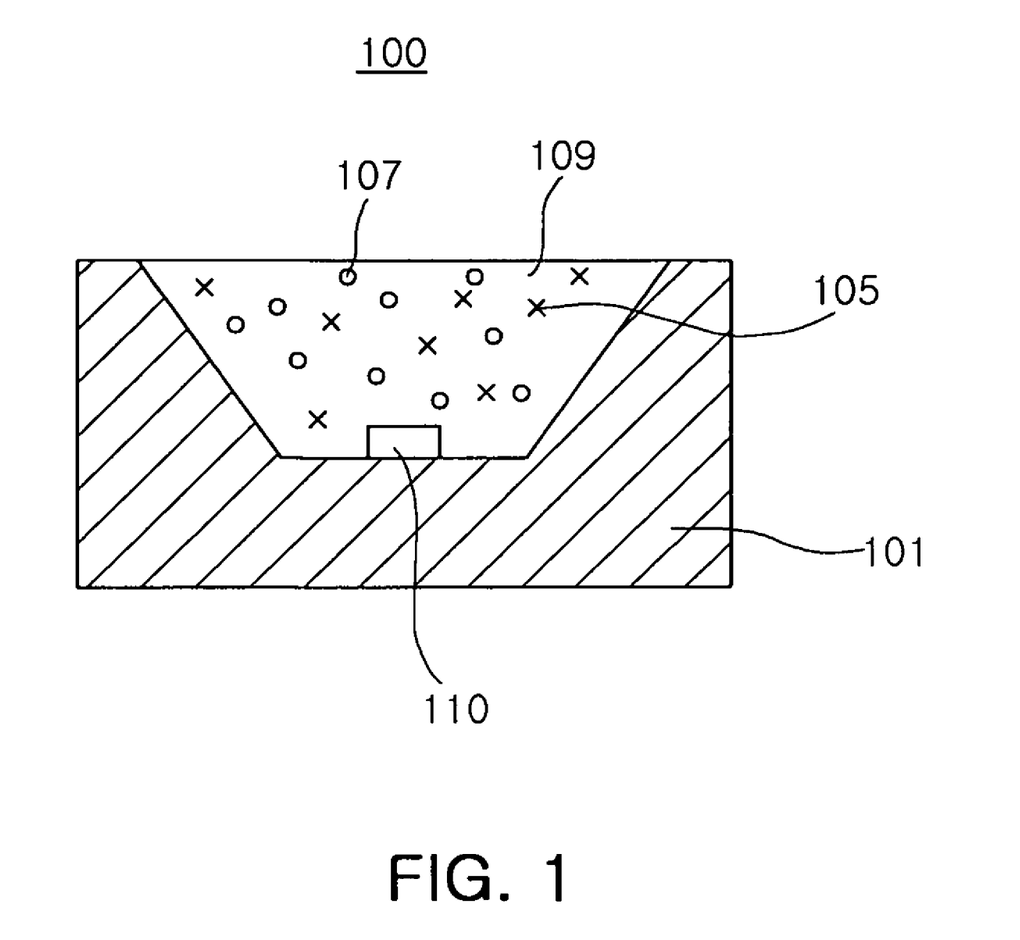
FIG. 1 is a cross-sectional view illustrating a light emitting device including a green phosphor according to one exemplary embodiment of the present invention.

FIG. 1 is a cross-sectional view illustrating a light emitting device 100 including a green phosphor according to one embodiment of the present invention.

According to one embodiment of the invention, the light emitting device 100 includes a light source 110 and phosphors 105 and 107 that absorb light emitted from the light source 110 and emit light. In the light emitting device 100, the phosphors include sulfide crystallographic phases and oxide crystallographic phases. The phosphors are multiphase compounds in which the crystallographic phases and the oxide crystallographic phases exist together.

The light emitting device 100 according to the embodiment of the invention may contain one or more phosphors 105 and 107. When the phosphor according to the embodiment of the invention is the green phosphor 105, the known red phosphor 107 may be contained in the known light emitting device 100 in addition to the green phosphor 105. When the light source 110 emits blue light, the light emitting device 100 can be a white light emitting device.

The light source 110 that can be used in the light emitting device 100 may be a light emitting diode or a laser diode.

When the light emitting diode or the laser diode is used, the light emitting diode or the laser diode emits light in response to power. Further, the phosphor 105 contained in the light emitting device 100 absorbs light from the light source 110 and emits light. At this time, the phosphor 105 emits light having a wavelength longer than that of the absorbed light. In particular, the wavelength of the light emitted from the light source 110 is preferably in the range of 400 to 480 nm in consideration of luminous efficiency of the phosphor.

Since a body 101 of the light emitting device 100 includes reflective plates, the reflective plates allow light from the light source 110 to be efficiently emitted. The reflection plates are formed at both ends of the body 101 so that the body 101 has the shape of a cup. When the light source 110 is placed in the body 101, resin 109 in which the phosphors 105 and 107 dispersed is injected into the cup-shaped body 101 to seal the light emitting device 100.

Hereinafter, a method of synthesizing phosphor materials according to another embodiment of the invention will be described. This embodiment is exemplified to describe a method of synthesizing phosphor materials according to the invention. The present invention is not limited to the above-described method. Different starting materials and synthesis techniques may be used to obtain the same results and compounds.

<Phosphor Synthesis>

Powdered metal sulfide (MS) and $Ga_2S_3$ may be used as starting materials to synthesize a phosphor $[SrGa_2S_4]$.$[MgGa_2O_4]:Eu^{2+}$ according to the embodiment of the invention. M may contain any one or both of magnesium and strontium.

First, a soluble salt solution, such as calcium and strontium carbonate, is produced to fabricate magnesium and strontium sulfates. Then, the sulfate salt is precipitated with sulphuric acid, and the liquid is decanted. The sulfate is rinsed to remove excess acid, and the precipitate is dried.

After the raw materials are mixed at a desired molar ratio, activating elements, that is, activators are slurried into the raw material mixture by using distilled water or de-ionized water and/or a solvent, such as isopropyl alcohol, methanol, and ethanol, as the slurry vehicle. In addition to a mixing method using slurry, dry mixing is also available.

The activators may contain at least one selected from a group consisting of cerium, praseodymium, neodymium, promethium, samarium, europium, gadolinium, terbium, dysprosium, holmium, erbium, thulium, ytterbium, and lutetium. The activator can be added as compounds or salts of the elements or sulfides, oxides, or carbonates of the elements.

The materials are thoroughly mixed by using general mixing devices, such as a mortar and pestle, a ball mill, and a grinder. Preferably, the result product is fired in a purified 95% $N_2$+5% $H_2$ (or $H_2S$) stream for four hours at temperature of approximately 1000° C. As a result, a $[SrGa_2S_4]$.$[MgGa_2O_4]:Eu^{2+}$ compound is created.

After being fired, the result product is cooled by using $H_2S$. At this time, in order to prevent sulfur condensation on the result product, argon gas may be used instead of $H_2S$. The purity of each of the starting materials and the materials used is controlled to increase the purity of the result product, the phosphor, such that high-purity crystallographic phases are contained in the phosphor.

Figure 2A:
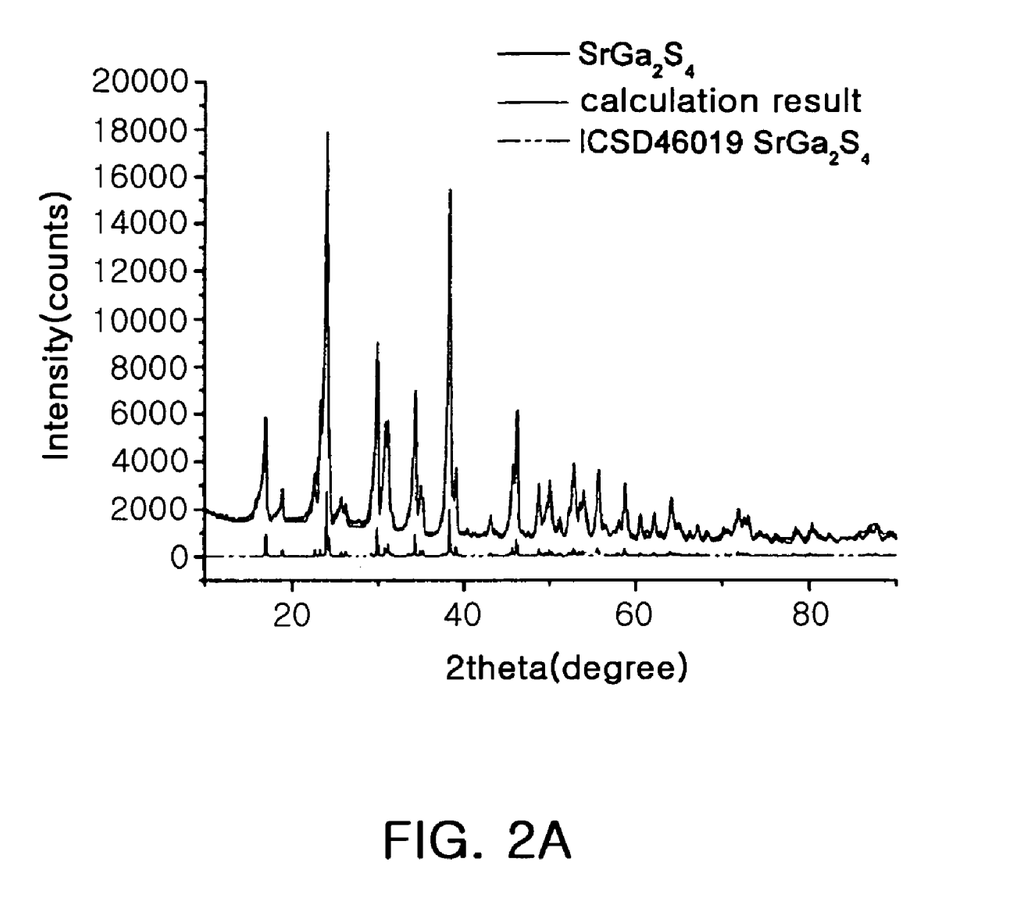
FIG. 2A is a view illustrating an XRD (X-ray diffraction) pattern of single phase $SrGa_2S_4$.
Figure 2B:
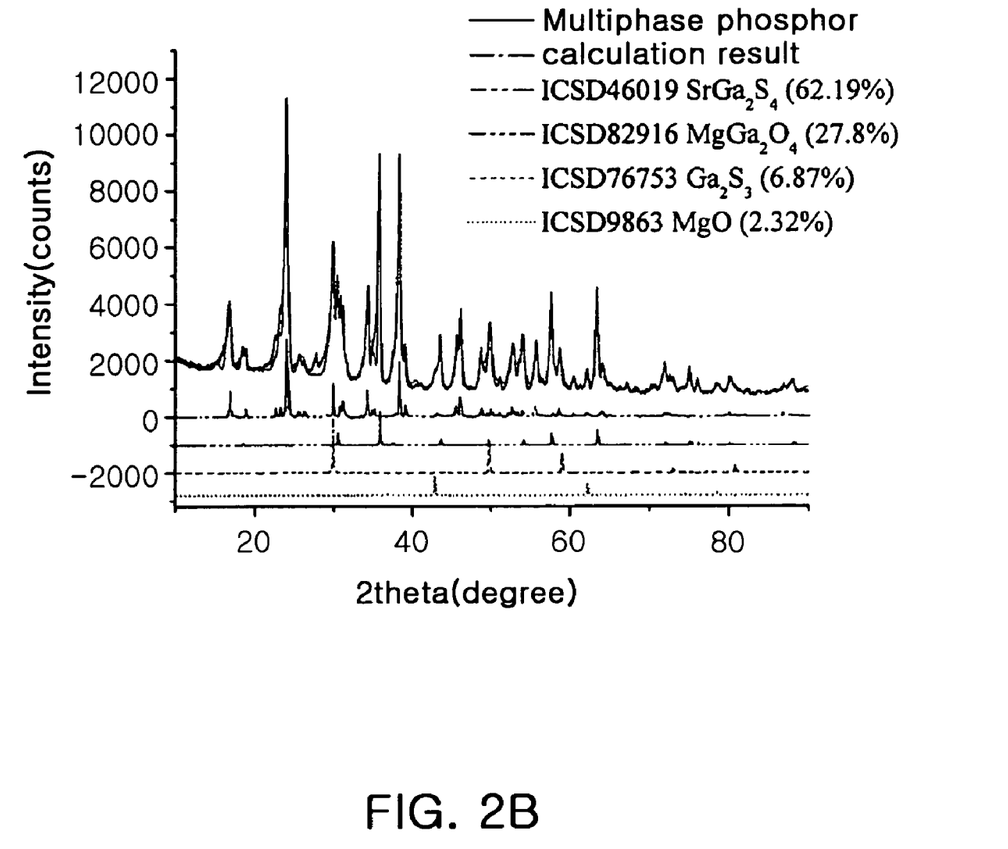
FIG. 2B is a view illustrating an XRD (X-ray diffraction) pattern of multiphase Eu-doped $[SrGa_2S_4].[MgGa_2O_4]$.

FIGS. 2A and 2B are views illustrating XRD (X-ray diffraction) patterns of a single phase $SrGa_2S_4$ sample and a multiphase Eu-doped $[SrGa_2S_4].[MgGa_2O_4]$ sample.

Referring to FIG. 2A, a crystal structure of the single phase phosphor $SrGa_2S_4:Eu^{2+}$ can be obtained on the basis of the XRD pattern of the single phase phosphor $SrGa_2S_4:Eu^{2+}$. It can be checked that the $SrGa_2S_4$ sample used in experiment is $SrGa_2S_4$ by comparison between an arithmetic value, which is theoretically calculated, and a value in a graph of $SrGa_2S_4$ in an inorganic crystal structure database.

In the same way, FIG. 2B is a view illustrating an XRD (X-ray Diffraction) pattern obtained from a sample of a multiphase phosphor. It was checked that $SrGa_2S_4$, $MgGa_2O_4$, $Ga_2S_3$, and MgO exist in the sample by comparison between an arithmetic value, which is theoretically calculated, and data of $SrGa_2S_4$, $MgGa_2O_4$, $Ga_2S_3$, and MgO in the organic crystal structure database. Further, on the basis of reference data, it was checked that $SrGa_2S_4$ of 62.19%, $MgGa_2O$ of 27.8%, $Ga_2S_3$ of 6.87%, and MgO of 2.32% exist in the sample.

Figure 3:
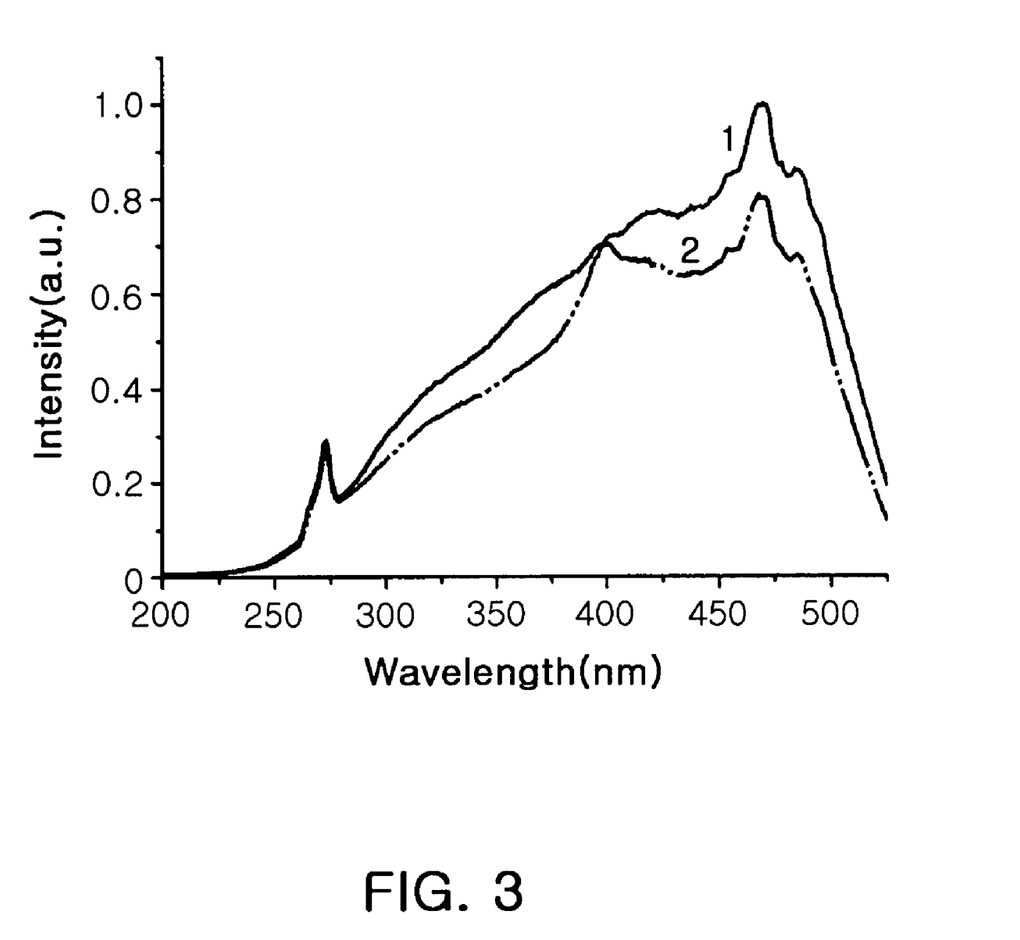
FIG. 3 is a view illustrating excitation spectra of Eu-doped $[SrGa_2S_4].[MgGa_2O_4]$ (1) and $SrGa_2S_4:Eu^{2+}$ (2).

FIG. 3 is a view illustrating excitation spectra of Eu-doped $[SrGa_2S_4]\cdot[MgGa_2O_4]$ (1) and $SrGa_2S_4:Eu^{2+}$ (2). As described above, a stronger nephelauxetic effect or centroid shift causes a shift in peak wavelength. A peak wavelength of Eu-doped $[SrGa_2S_4]\cdot[MgGa_2O_4]$ shifts from 535 nm, which corresponds to a peak wavelength of $SrGa_2S_4:Eu^{2+}$, to 540 nm. Further, at the emission wavelength of 535 nm, the Eu-doped $[SrGa_2S_4]\cdot[MgGa_2O_4]$ has a higher intensity than the $SrGa_2S_4:Eu^{2+}$ When a light source has a wavelength ranging from 400 to 480 nm, the Eu-doped $[SrGa_2S_4]\cdot[MgGa_2O_4]$ phosphor has high luminous efficiency.

Figure 4:
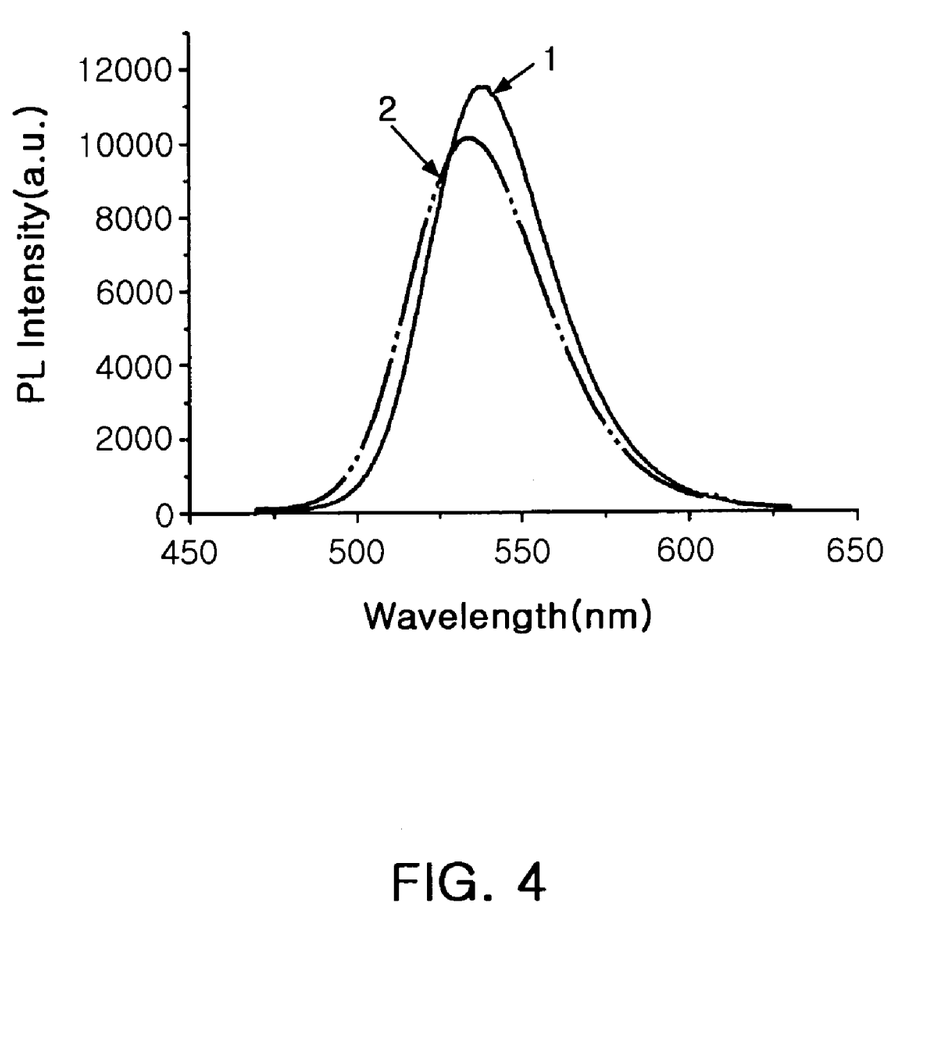
FIG. 4 is a view illustrating emission spectra of Eu-doped $[SrGa_2S_4].[MgGa_2O_4]$ (1) and $SrGa_2S_4$ (2).

FIG. 4 is a view illustrating emission spectra of Eu-doped $[SrGa_2S_4]\cdot[MgGa_2O_4]$ (1) and $SrGa_2S_4$ (2). In FIG. 4, it can be checked that the Eu-doped $[SrGa_2S_4]\cdot[MgGa_2O_4]$ has higher intensity than the single phase strontium thiogallate. The intensity and the luminous efficiency of the emission spectra can be controlled by adjusting the proportion of the $[SrGa_2S_4]$ phase and the $[MgGa_2O_4]$ phase.

More specifically, in Table 1, emission spectra of the Eu-doped $[SrGa_2S_4]\cdot[MgGa_2O_4]$ and the single phase strontium thiogallate are compared according to intensity, luminescence, a full width half maximum (FWHM), and a peak wavelength.

TABLE 1

|  | $[SrGa_2S_4]\cdot[MgGa_2O_4]:Eu^{2+}$ | $SrGa_2S_4:Eu^{2+}$ |
|---|---|---|
| Intensity (%) | 114 | 100 |
| Luminescence (%) | 110 | 100 |
| FWHM (nm) | 44 | 49 |
| Peak wavelength (nm) | 540 | 535 |

The Eu-doped $[SrGa_2S_4]\cdot[MgGa_2O_4]$ has a higher value than the single phase strontium thiogallate in terms of the intensity and the luminescence. Further, Eu-doped $[SrGa_2S_4]\cdot[MgGa_2O_4]$ has a smaller value than the single phase strontium thiogallate in terms of FWHM. Since the Eu-doped $[SrGa_2S_4]\cdot[MgGa_2O_4]$ has a smaller value than the single phase strontium thiogallate in terms of FWHM, the Eu-doped $[SrGa_2S_4]\cdot[MgGa_2O_4]$ has higher intensity over a smaller area. When the Eu-doped $[SrGa_2S_4]\cdot[MgGa_2O_4]$ is used in the white light emitting device, luminous efficiency increases. The peak wavelength of the Eu-doped $[SrGa_2S_4]\cdot[MgGa_2O_4]$ is shifted as shown in FIG. 4.

Figure 5:
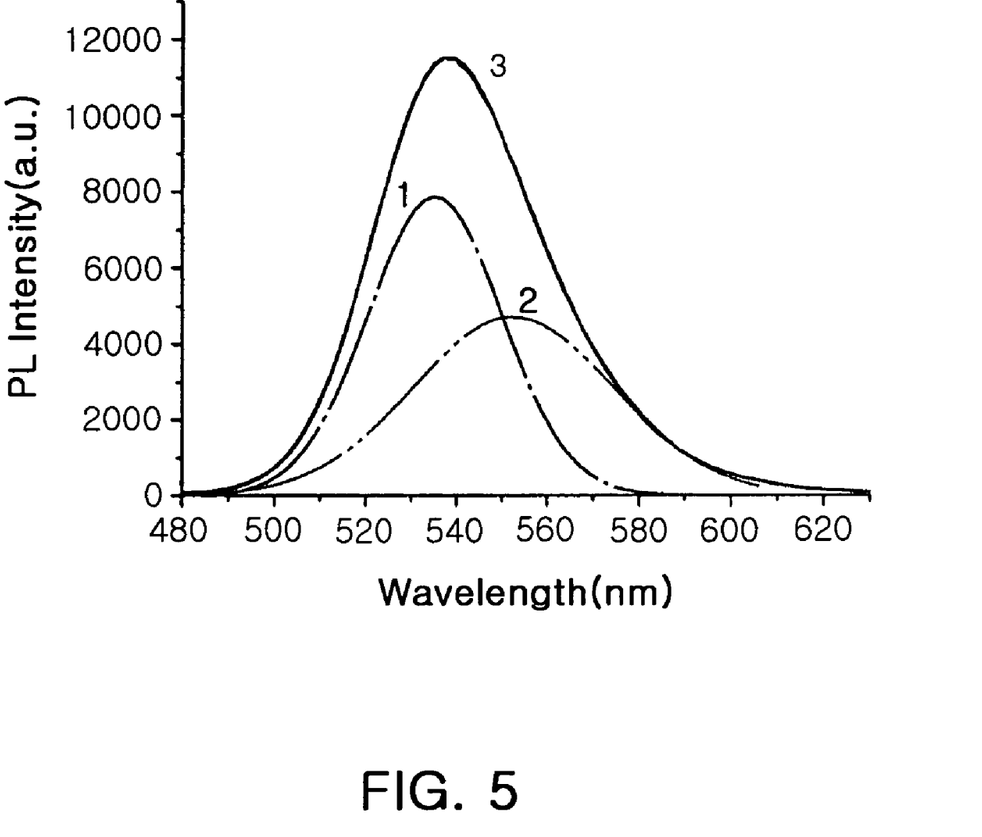
FIG. 5 is a view illustrating an emission spectrum of Eu-doped $[SrGa_2S_4].[MgGa_2O_4]$ (3) that is decomposed into $SrGa_2S_4$(1) having a peak wavelength of 535 nm and other phases (2).

FIG. 5 is a view illustrating an emission spectrum of Eu-doped $[SrGa_2S_4]\cdot[MgGa_2O_4]$ (3) that is decomposed into $SrGa_2S_4$ (1) having a peak wavelength of 535 nm and other phases (2). When the emission spectrum of the Eu-doped $[SrGa_2S_4]\cdot[MgGa_2O_4]$ is decomposed into $SrGa_2S_4$ (1) having a peak wavelength of 535 nm and other phases (2), it can be seen that the addition of $MgGa_2O_4$ causes an increase in intensity by approximately 15% when compared with the $SrGa_2S_4$ phosphor.

As set forth above, according to exemplary embodiments of the invention, phosphors are used to control peak wavelengths of emission spectra at desired wavelengths by controlling the proportion of crystallographic phases, thereby increasing the intensity of light emitted.

Further, as quantum efficiency increases, high luminous efficiency is obtained at a desired wavelength, and good light output stability is obtained.

Further, a light emitting device using the phosphors according to the embodiment of the invention increases brightness to thereby increase product quality and reliability.

While the present invention has been shown and described in connection with the exemplary embodiments, it will be apparent to those skilled in the art that modifications and variations can be made without departing from the spirit and scope of the invention as defined by the appended claims.

What is claimed is:

1. A phosphor, comprising:
a sulfide crystallographic phase; and
an oxide crystallographic phase,
wherein the phosphor is a multiphase compound in which the sulfide crystallographic phase and the oxide crystallographic phase exist together,
wherein the sulfide crystallographic phase is strontium thiogallate ($SrGa_2S_4$),
wherein the oxide crystallographic phase is a magnesium gallium oxide ($MgGa_2O_4$).

2. The phosphor of claim 1, further comprising:
an activator,
wherein the activator comprises at least one rare earth element.

3. The phosphor of claim 2, wherein the activator comprises at least one element selected from a group consisting of cerium, praseodymium, neodymium, promethium, samarium, europium, gadolinium, terbium, dysprosium, holmium, erbium, thulium, ytterbium, and lutetium.

4. The phosphor of claim 2, further comprising:
a co-activator,
wherein the co-activator comprises at least one element selected from a group consisting of chlorine, bromine, and lithium.

5. The phosphor of claim 1, wherein the phosphor includes: $Eu^{2+}$.

6. A light emitting device, comprising:
a light source; and
a phosphor absorbing light emitted from the light source to emit light,
wherein the phosphor includes a sulfide crystallographic phase and an oxide crystallographic phase, and the phosphor is a multiphase compound in which the sulfide crystallographic phase and the oxide crystallographic phase exist together,
wherein the sulfide crystallographic phase is strontium thiogallate ($SrGa_2S_4$),
wherein the oxide crystallographic phase is a magnesium gallium oxide ($MgGa_2O_4$).

7. The light emitting device of claim 6, wherein the light source is any one of a light emitting diode or a laser diode.

8. The light emitting device of claim 6, wherein the light source emits light with a wavelength ranging from 400 to 480 nm.

9. The light emitting device of claim 6, wherein the phosphor comprises: $Eu^{2+}$.

10. The light emitting device of claim 8, further comprising a red phosphor.

11. The light emitting device of claim 10, wherein the light emitting device is a blue light emitting diode, and the multiphase compound is a green phosphor.

12. The light emitting device of claim 11, wherein the green phosphor comprises: $Eu^{2+}$.

* * * * *